(12) United States Patent
Ferlitsch

(10) Patent No.: US 8,023,161 B2
(45) Date of Patent: Sep. 20, 2011

(54) SYSTEMS AND METHODS FOR PROVIDING IMAGE DATA ENCAPSULATED IN A PAGE DESCRIPTION LANGUAGE

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1400 days.

(21) Appl. No.: 10/787,365

(22) Filed: Feb. 26, 2004

(65) Prior Publication Data

US 2005/0190397 A1   Sep. 1, 2005

(51) Int. Cl.
*H04N 1/04* (2006.01)
*G06F 15/00* (2006.01)
*G06F 3/12* (2006.01)
*G06K 1/00* (2006.01)

(52) U.S. Cl. ...................................... 358/474; 358/1.13
(58) Field of Classification Search .................. 358/1.15, 358/462, 474, 539
See application file for complete search history.

(56) References Cited

U.S. PATENT DOCUMENTS

| | | | | |
|---|---|---|---|---|
| 5,465,322 A * | 11/1995 | Hsu et al. | ...................... | 358/1.15 |
| 5,493,634 A * | 2/1996 | Bonk et al. | ...................... | 358/1.1 |
| 6,248,966 B1 | 6/2001 | Nakase et al. | | |
| 6,424,429 B1 * | 7/2002 | Takahashi et al. | ........... | 358/1.16 |
| 6,437,875 B1 | 8/2002 | Unno | | |
| 6,466,329 B1 * | 10/2002 | Mukai | .......................... | 358/1.15 |
| 7,315,979 B1 * | 1/2008 | Walker | .......................... | 715/234 |
| 2002/0078275 A1 * | 6/2002 | Yamaguchi | ...................... | 710/72 |
| 2002/0114021 A1 * | 8/2002 | Lavender et al. | .............. | 358/474 |
| 2003/0002068 A1 * | 1/2003 | Constantin et al. | .......... | 358/1.15 |
| 2003/0007177 A1 * | 1/2003 | Ferlitsch | ...................... | 358/1.15 |
| 2003/0133090 A1 | 7/2003 | Kato | | |
| 2005/0012956 A1 * | 1/2005 | Castle | .......................... | 358/1.15 |
| 2005/0062987 A1 * | 3/2005 | Hashimoto et al. | ............ | 358/1.9 |
| 2006/0045386 A1 * | 3/2006 | Fukuoka et al. | .............. | 382/305 |

FOREIGN PATENT DOCUMENTS

| | | |
|---|---|---|
| EP | 0 478 335 | 9/1991 |
| EP | 0 564 201 | 5/2000 |
| JP | 6-3083825 | 4/1988 |
| JP | 2001-312377 | 11/2001 |
| WO | WO 02/23884 | 3/2002 |

* cited by examiner

*Primary Examiner* — Douglas Tran
(74) *Attorney, Agent, or Firm* — Austin Rapp & Hardman

(57) ABSTRACT

A multi-function peripheral imaging device for providing page description language ("PDL") encapsulated image data is disclosed. The imaging device includes a processor for control of the imaging device and memory in electronic communication with the processor. The imaging device also includes a scanner in electronic communication with the processor and a printer in electronic communication with the processor. The multi-function peripheral imaging device includes a control panel for operation of the imaging device by a user. The control panel is in electronic communication with the processor for receiving user inputs. Executable instructions are included that are configured to implement a method for providing PDL encapsulated image data. An image is scanned using the scanner to produce image data. Document and page formatting inputs are obtained from the control panel. The image data is encapsulated in a page description language at the imaging device using the document and page formatting inputs for document formatting.

30 Claims, 9 Drawing Sheets

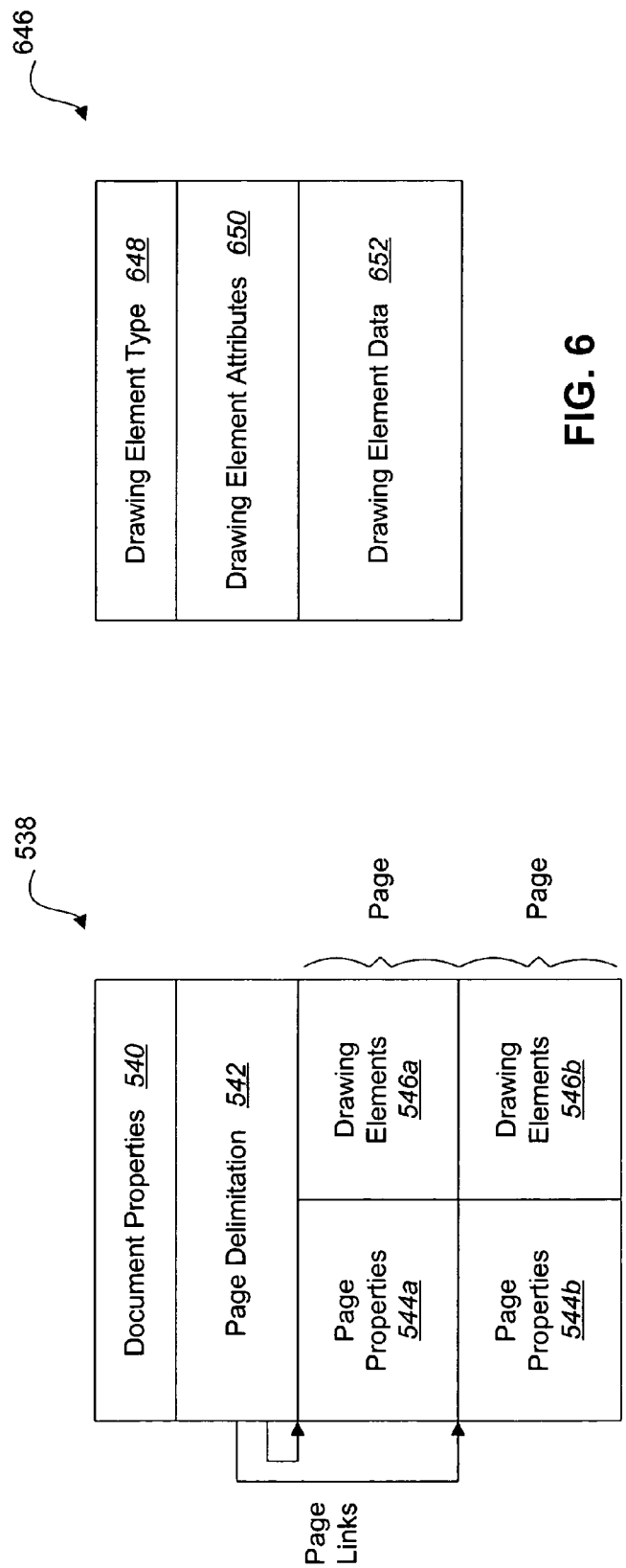

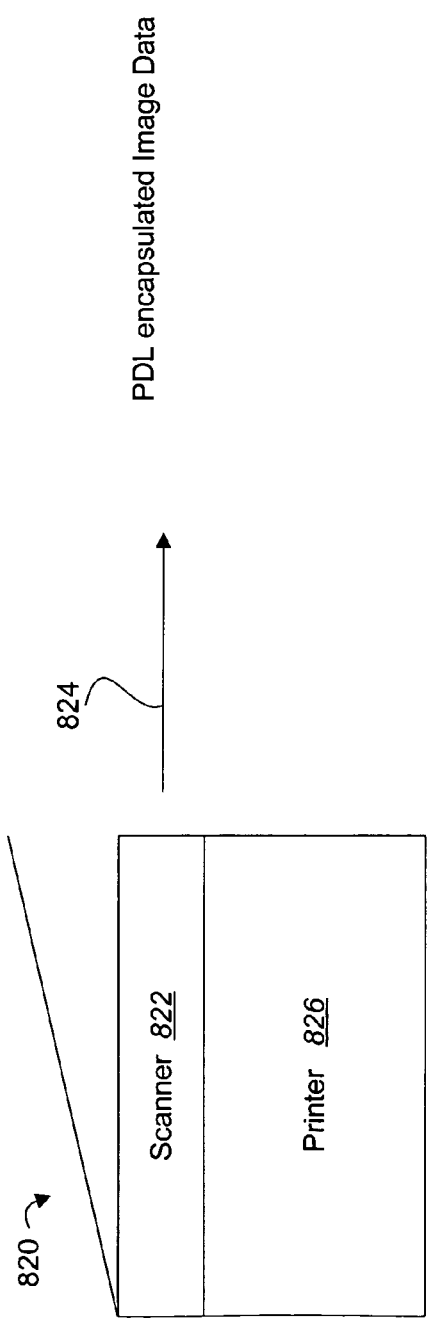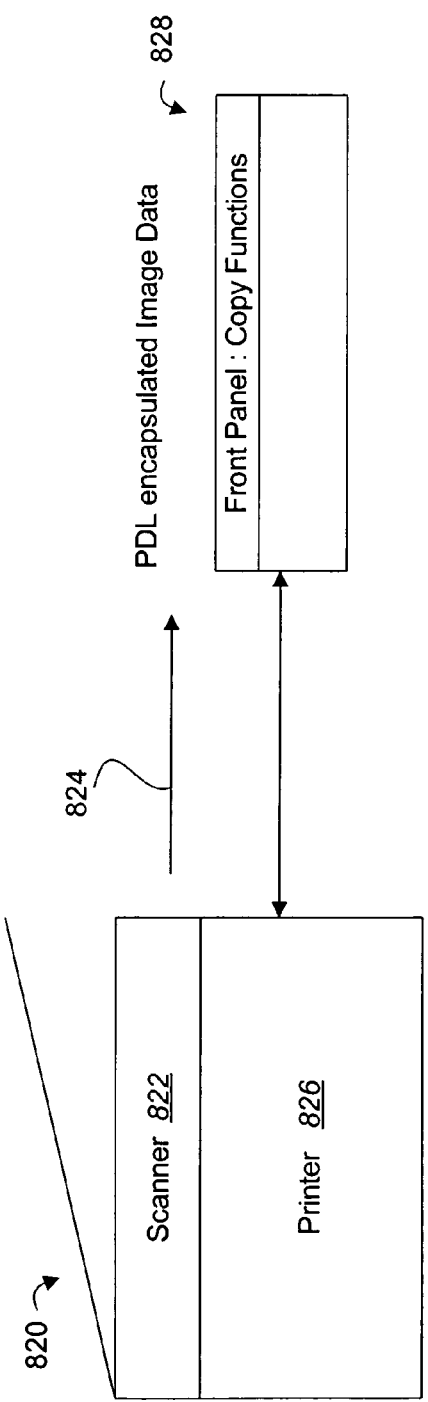

SYSTEMS AND METHODS FOR PROVIDING IMAGE DATA ENCAPSULATED IN A PAGE DESCRIPTION LANGUAGE

TECHNICAL FIELD

The present invention relates generally to obtaining image data from an imaging device. More specifically, the present invention relates to systems and methods for providing image data encapsulated in a page description language.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, or a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

In imaging devices a user can typically perform a variety of imaging functions from various inputs to various outputs. Some of these functions, such as print and copy, allow the user to frame the output as a document. That is, the user is able to specify document formatting options either from the front panel or from a user interface on a host. Some possible document formatting options include such options as paper size, placement of pages, scale, orientation and pagination.

When an image is scanned the imaging device produces image data. Many graphics files are image data files. With image data there is no inherent concept of a document. Instead, the image data is an unframed image of arbitrary size based on an application viewer's interpretation of the images size (e.g., horizontal and vertical sizes) and resolution. Therefore, the viewer makes arbitrary decisions on how the images are viewed, such as scale and placement.

In certain computing environments, it would be desirable for a user to document frame an image output from an imaging device. Benefits may be realized by providing improved systems and methods for document framing imaging date.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 5 is a logical block diagram illustrating a general format for PDL encapsulated image data;

FIG. 6 is a logical block diagram illustrating a drawing element;

FIG. 8 is an illustration of an imaging device providing PDL encapsulated image data;

FIG. 9 is an illustration of a user specifying copy function options when generating PDL scanned image data;

DETAILED DESCRIPTION

Figure 1:
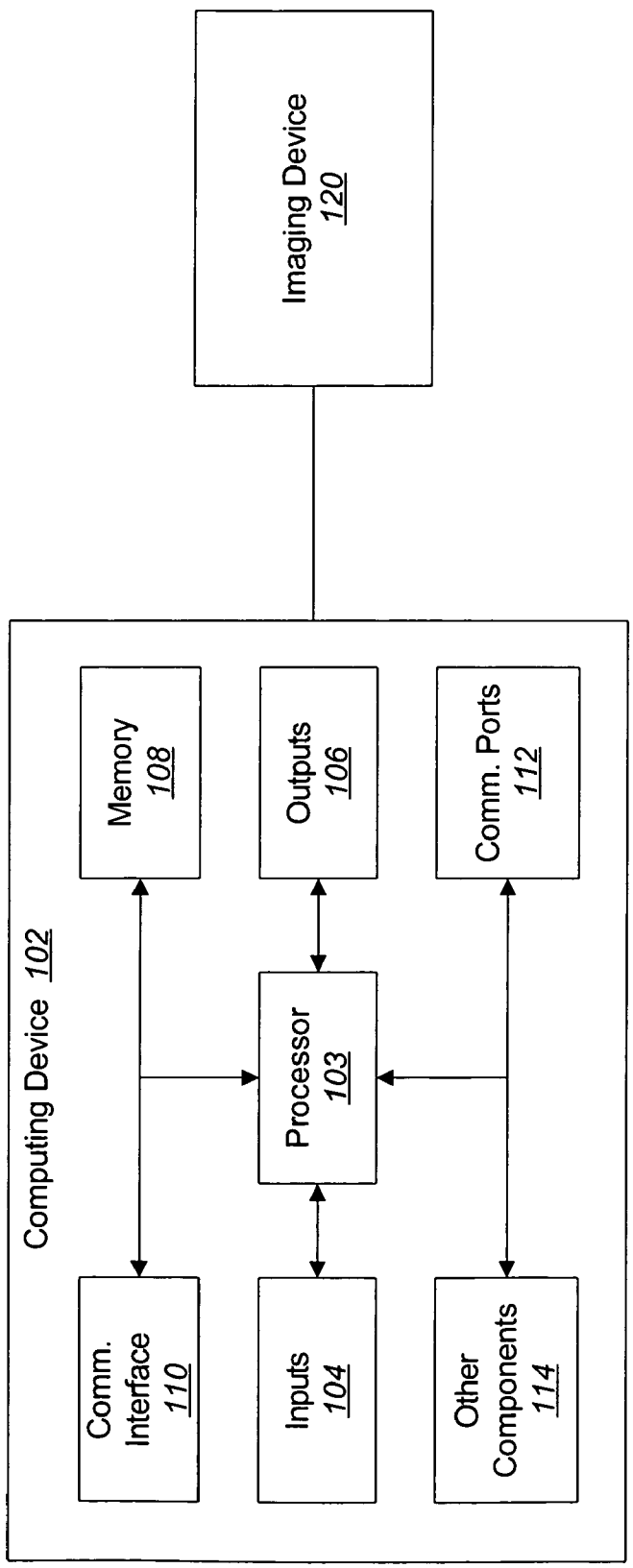
FIG. 1 is a block diagram illustrating the major hardware components typically utilized with embodiments herein.

A method for providing page description language ("PDL") encapsulated image data from an imaging device that includes a scanner is disclosed. An image is scanned using the scanner to produce image data. Document formatting inputs are obtained. The image data is encapsulated in a page description language using the document formatting inputs for document formatting. The encapsulating occurs at the imaging device. The page description language is transmitted to a computing device from the imaging device.

The document formatting inputs may be obtained from a control panel on the imaging device. In addition, the document formatting inputs may be obtained from a local user interface. In other embodiments, the document formatting inputs may be obtained from a remote user interface.

The image data may be encapsulated in the page description language such that the image is framed into a document.

In one embodiment the imaging device may be a multi-function peripheral. In a further embodiment the imaging device may comprise a multi-function peripheral and the document formatting inputs may be obtained from a control panel on the multi-function peripheral. The control panel in this embodiment may also be used for a user input for a copy function of the multi-function peripheral.

The document formatting inputs may include various items including, but not limited to, a page size input, a scale input, a placement input, a pagination input, a number of images per page input, a page order input, a document style input, a post collation operations input, a page delimitation input, an orientation input and a margins input.

The page description language may include document wide properties, page delimitation properties, page properties and one or more drawing elements. The page description language may be selected from the group consisting of a portable document format (PDF), postscript (PS), printer control language (PCL), HP GL/2, IBM IPDS, IBM SCS, Epson EscP and DDIF.

An imaging device that comprises a scanner for providing page description language ("PDL") encapsulated image data is disclosed. The imaging device includes a processor for control of the imaging device and memory in electronic communication with the processor. The imaging device also includes a scanner in electronic communication with the processor. The imaging device includes a control panel for operation of the imaging device by a user. The control panel is in electronic communication with the processor for receiving user inputs. Executable instructions are included that are configured to implement a method for providing PDL encapsulated image data. An image is scanned using the scanner to produce image data. Document formatting inputs are obtained from the control panel. The image data is encapsulated in a page description language at the imaging device using the document formatting inputs for document formatting.

In another embodiment, the scanned image data is obtained from an electronic source, such as from a facsimile reception or input of a digital image from a memory stick input.

A computer-readable medium for storing program data is also disclosed. The program data comprises executable instructions for implementing a method in a computing device for providing page description language ("PDL") encapsulated image data from an imaging device that includes a scanner. Image data is obtained at an imaging device. Document formatting inputs are obtained. The image data is encapsulated in a page description language using the document formatting inputs for document formatting. The encapsulating occurs at the imaging device. The page description language is transmitted to a computing device from the imaging device.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Of course, those skilled in the art will appreciate the many kinds of different devices that may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. The imaging device may be a single or a plural grouping (e.g., pool or cluster) of two or more devices.

In light of the definition of an imaging device 120 above, the term imaging job, as used herein, is broadly defined as any instruction or set of instructions that are sent to an imaging device to cause an image to be printed, imaged, scanned, sent, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Scan jobs and scanning devices are used to illustrate exemplary embodiments, but other kinds of imaging jobs and imaging devices may be used in implementations of the embodiments disclosed herein.

Figure 2:
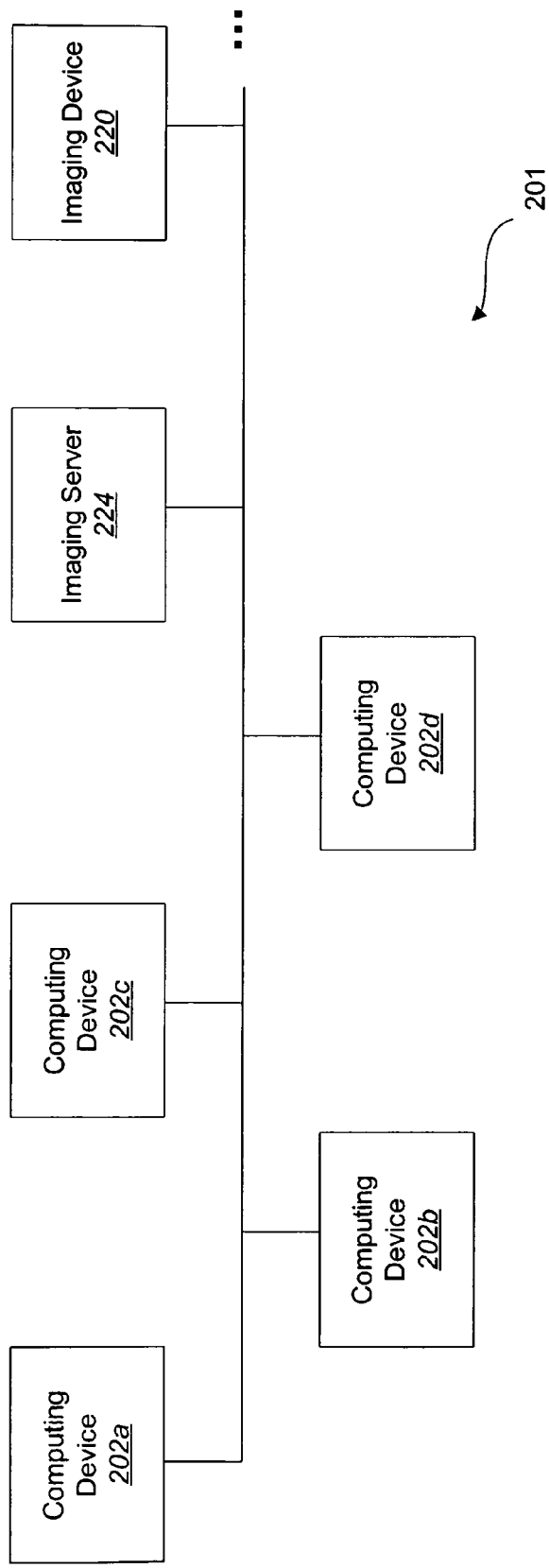
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network comprising a plurality of computing devices 202, an imaging device 220 and an imaging server 224.

This invention is independent of the job control command and image data language and syntax. For example, the job control language may be PJL and the imaging job data language may be PCL or Postscript.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a scan job may be initiated by an application using a scanner driver which spools a scan job to the print/scan spooler. By way of further example, the scan job may be initiated at the operations panel (e.g., front panel) of the imaging device.

The systems and methods herein are independent of the method to initiate the imaging job and the method to despool the image job and/or imaging result to/from the imaging client and imaging device.

The systems and methods of embodiments of the present invention typically comprise one or more scanning or multi-functional peripheral (MFP) devices, which may be connected locally, through a network or through a remote scanning environment. These systems and methods may further comprise a computing device capable of generating or transmitting a scan job to a scanning device as in "pull scanning" or transmitting the location to receive the result of the scan job (i.e., scanned image data) from the scanning device as in "push scanning". These embodiments may also comprise a scanner driver, a spooler, a scan processor and other scan system components that process, transmit or otherwise function to produce a scan job. In some embodiments, these components may exist in a Microsoft Windows 98, Me, NT, 2000, XP, 2003 Server or similar operating system. Details of these operating system print system components and processes may be obtained by reference to the Microsoft Windows Driver Development Kits (DDKs) and associated documentation, which are hereby incorporated herein by reference.

The definitions in this and subsequent paragraphs apply throughout this specification and related claims. The term "scan job" may refer to any combination of data that can be scanned image data. Scanned image data may comprise a single or multiple bitmap images, or be additionally decomposed into non-bitmap components such as text and line/art.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

In a typical scanning environment, a user may initiate a scan job, which generally comprises a single hardcopy document, sheet or photographs. In some embodiments, a user may also initiate a scan task, which may comprise one or more documents consisting of one or more pages each. A scan task may also comprise multiple copies of the resulting scanned image data to one or more recipients.

Generally, when a scan job or task is initiated, a user makes an input selection to initiate the process. The scanning or computing device may respond with the display of a dialog such as a scan dialog box, a command line query, a panel display or some other form of user interface that allows a user to select scan task options. One option may be the selection of the scanning and/or recipient device such as a computing device, table PC, printer, plotter, Multi-Function Peripheral (MFP), CD burner or other device. Once the scanning and/or recipient device is selected, an additional dialog may be presented to prompt a user of options available on the selected device. Options such as scan quality, image size, orientation, watermarks and other options may be selected.

In some embodiments of the present invention, scan system components may present the user with a dialog that provides scan job or print task interleaving options. Other embodiments may automatically select interleaving options for print jobs or tasks.

In an MFP device, a user can perform a variety of imaging functions from various inputs (such as paper or electronic data) to various outputs (such as paper or electronic data). Most of these functions, such as print and copy, allow the user to frame the output as a document. That is, they are able to specify, either from the front panel (i.e., copy job) or from a user interface on a host (i.e., print job), the paper size, placement of pages, scale, orientation and pagination (e.g., booklet order). One exception to this is the scanning operation, where the user scans in paper documents and produces an electronic data output. Typically, the output is in an industry standard image format, such as TIFF 6.0.

With image data there is no inherent concept of a document. Instead, it is an unframed image of arbitrary size based on an application viewer's interpretation of the images size (e.g., horizontal and vertical sizes) and resolution. Therefore, the viewer makes arbitrary decisions on how the images are viewed, such as scale and placement.

One improvement, as demonstrated with Sharp ImagePDF which can be generated using a Sharp AR-N275 network scanning feature, encapsulates the image data into portable document format (PDF). By encapsulating the image data into a document format, there is an association with each image to a page. Therefore the document page imposes a structure (i.e., framing) on how the image is viewed.

While this is an improvement, the Sharp ImagePDF format is still limited in that the page properties are arbitrarily set by the MFP device. In other words, at the MFP the user has no control of how the images are framed into the document. Therefore, there is a desire for a method for a user to document frame an image output in a scan operation from an MFP with the same capabilities that the user would have if the output would have been paper (i.e., copy job).

Figure 3:
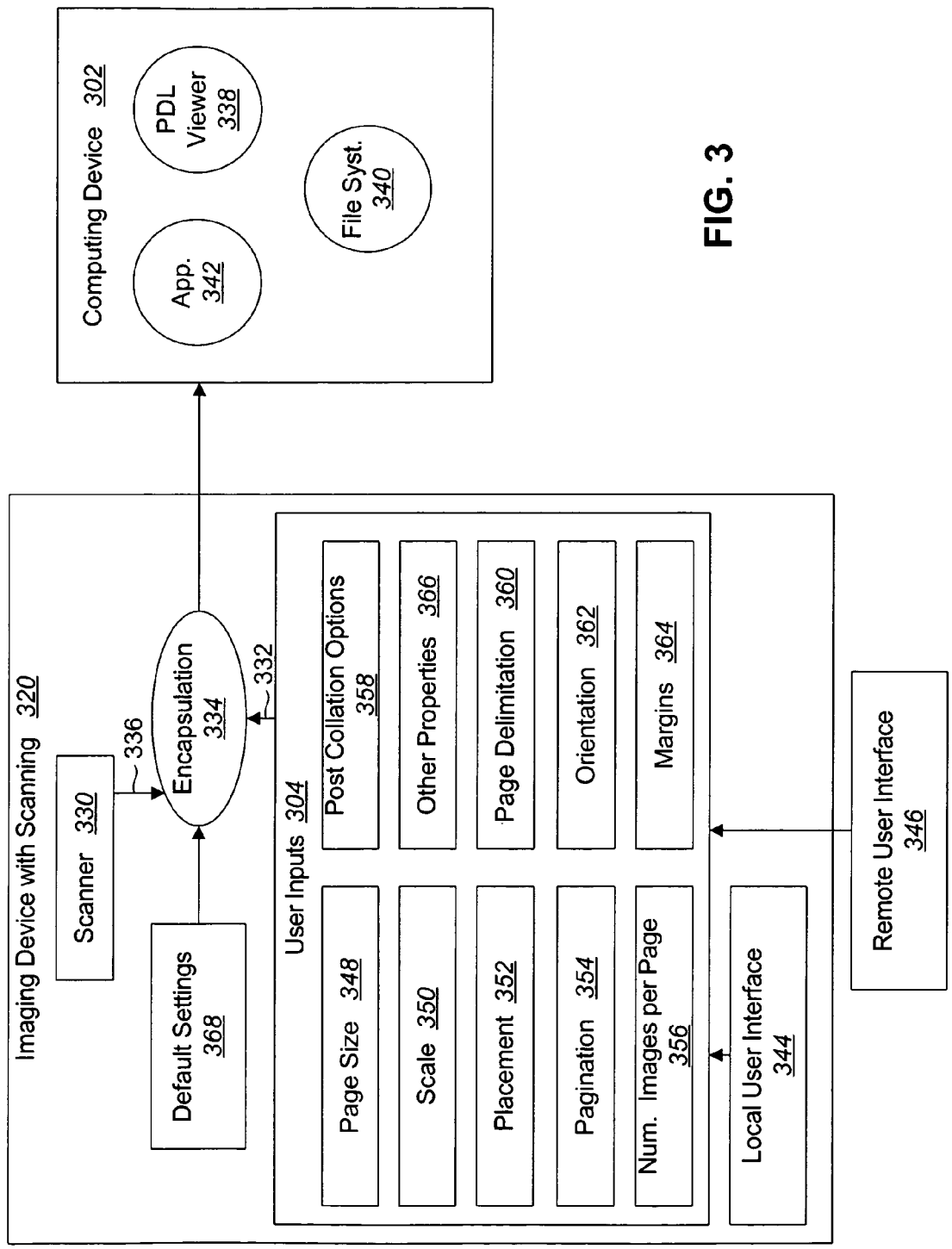
FIG. 3 is a logical block diagram to provide a context for the systems and methods herein.

FIG. 3 is a logical block diagram of one embodiment of a system for providing PDL encapsulated image data. An imaging device 320 is in electronic communication with a computer device 302. The imaging device 320 includes a scanner 330. For example, the imaging device 320 may be an MFP. The imaging device 320 includes a processor, memory and supporting circuitry (not shown). The imaging device 320 is a type of computing device 102 as shown in FIG. 1.

A scanned image output 336 is produced from a scan operation on the imaging device 320 and the scanned image data 336 is framed into a document format (e.g., page size, scale, placement, pagination, etc.). By way of example, if the imaging device 320 had copy capabilities, the scanned image data 336 is framed into a document format (e.g., page size, scale, placement, pagination, etc.) based on the same capabilities as if the user had performed a copy function (i.e., paper out) on the imaging device 320.

The term "scanner" as used herein is a general use and includes a device or component that does any one or more of the following: (1) reads hardcopy input to produce image data (e.g., paper in), (2) reads softcopy input to produce image data (e.g., eBook input), or (3) reads softcopy input to extract image data (e.g., image attachment in email).

The system uses user inputs 304 to obtain the document framing/formatting options 332 that are used by an encapsulation process 334. The encapsulation process 334 takes the image data 336 from the scanner 330 and encapsulates the image data 336 as page data to provide PDL encapsulated image data 338. The PDL 338 is then transmitted to the computing device 302. The computing device 302 may perform a number of operations on or with the PDL data 338 including, but not limited to, storing the data 338 on a file system 340, processing it 338 with an application 342 and/or viewing it 338 with a PDL viewer 388.

The user inputs 304 may be obtained in a number of ways. For example a local user interface 344 may be used to obtain the user inputs 304. Examples of a local user interface 344 include, but are not limited to, a front panel on the imaging device 320, one or more switches on the imaging device 320, etc. The user inputs 304 may also be obtained from a remote user interface 346. For example, a web page may obtain user inputs from a user that is remote from the imaging device 320. The user inputs 304 may also have been previously obtained and stored such that the inputs 304 are read from a file on a storage device without the use of a user interface at the time the encapsulation process 334 obtains the user inputs 304. The device 320 may also have default settings 368 that may be used.

The user inputs 304 include any input that may affect the document formatting of the PDL encapsulated image data 338. Possible user inputs 304 include, but are not limited to, page size 348, scale 350, placement 352, pagination 354, number of images per page 356, post collation operations 358, page delimitation 360, orientation 362, margins 364 and/or other document formatting properties 366.

Figure 4:
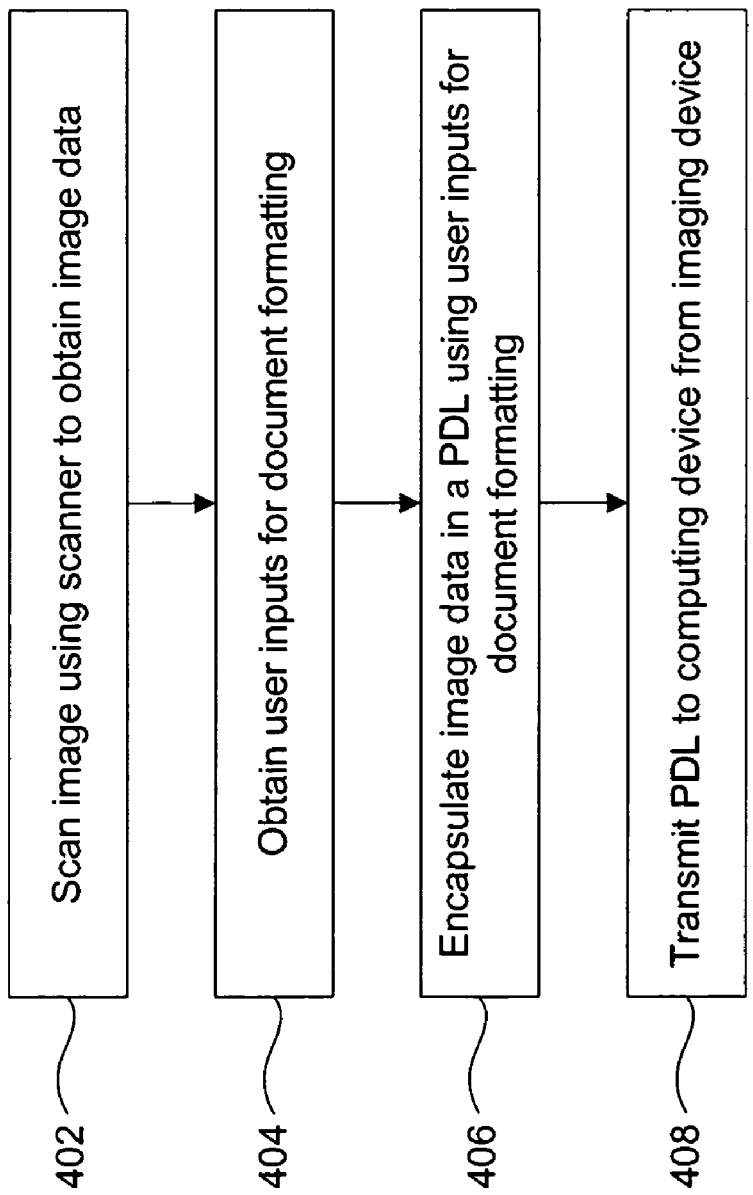
FIG. 4 is a flow diagram of one embodiment of a method for providing Page Description Language ("PDL") encapsulated image data.

FIG. 4 is a flow diagram of one embodiment of a method for providing PDL encapsulated image data. An image is scanned 402 using a scanner to obtain image data. User inputs for document formatting are obtained 404. Then the image data is encapsulated 406 in a PDL using the user inputs for document formatting. The encapsulation 406 takes place at the imaging device 120. Then the PDL is either stored on the imaging device 120 or transmitted 408 to the computing device 102 from the imaging device 120, or to another imaging device 120, such as a facsimile device.

These systems and methods may treat a scan job as a copy job with an electronic output instead of paper. When the user initiates a scan, the user is able to use the copy functions of the control panel of the imaging device 120 to specify how the image data is to be document formatted. For example, the user may specify the page size 348, number of images per page 356 (e.g., 2-up), and pagination 354 (e.g., booklet). The user may also specify post-collation options 358, such as stapling.

The MFP then encapsulates 406 the image data 336 (e.g., TIFF) into a PDL format (e.g., PDF) which is compatible with the MFP. When the image data 336 is encapsulated in the PDL format, the user inputs 304 (e.g., copy function options specified by the user at the front panel) are reflected in the PDL's document and page properties. Thus, when the PDL encapsulated image data 338 is viewed by a PDL viewer 338, the image data will be framed in a document according to the options 304 specified at the front panel. Likewise, if the PDL encapsulated image data 338 is then sent directly to the MFP as a print job, the output would be identical as if the original operation was a copy job instead of a scan job.

FIG. 5 is a logical block diagram illustrating a general format for PDL encapsulated image data 538. As described above, the image data 336 that is scanned in by an imaging device 120 is encapsulated as page data in a page description language (PDL). In one embodiment the imaging device 120 may be a multi-functional peripheral ("MFP") device with copy capabilities. However it will be understood that this MFP device is only exemplary and is not meant to be limiting. Examples of page description languages include Adobe portable document format (PDF), Adobe Postscript® (PS), Hewlett Packard printer control language (PCL), HP GL/2, IBM IPDS, IBM SCS, Epson EscP and DDIF.

The PDL data 538 includes the following parts. The PDL data 538 includes document wide properties 540. Document wide properties 540 pertain to the rendering (e.g., view or print) of the document as a whole (e.g., double sided, booklet, default page size). The PDL data 538 also includes a delimitation of pages 542. The PDL data 538 also includes one or more page properties 544. The page properties 544 pertain to the rendering of the specific page (e.g., page orientation, margins). There are one or more drawing elements 546 per page. The drawing elements 546 per page represent the visual representation of the document data when the document is rendered (e.g., a bitmap of a certain size/scale placed at a specified cursor position).

FIG. 6 is a logical block diagram illustrating a drawing element 646. A drawing element 646 includes a drawing element type 648. The drawing element type 648 is an identification (e.g., opcode) of the type of drawing element (e.g., text, line art, bitmap). The drawing element 646 also includes drawing element attributes 650. The drawing element attributes 650 include the data necessary for rendering the element (e.g., size, scale, placement). The drawing element data 652 is the data to render (e.g., text, bitmap).

Figure 7:
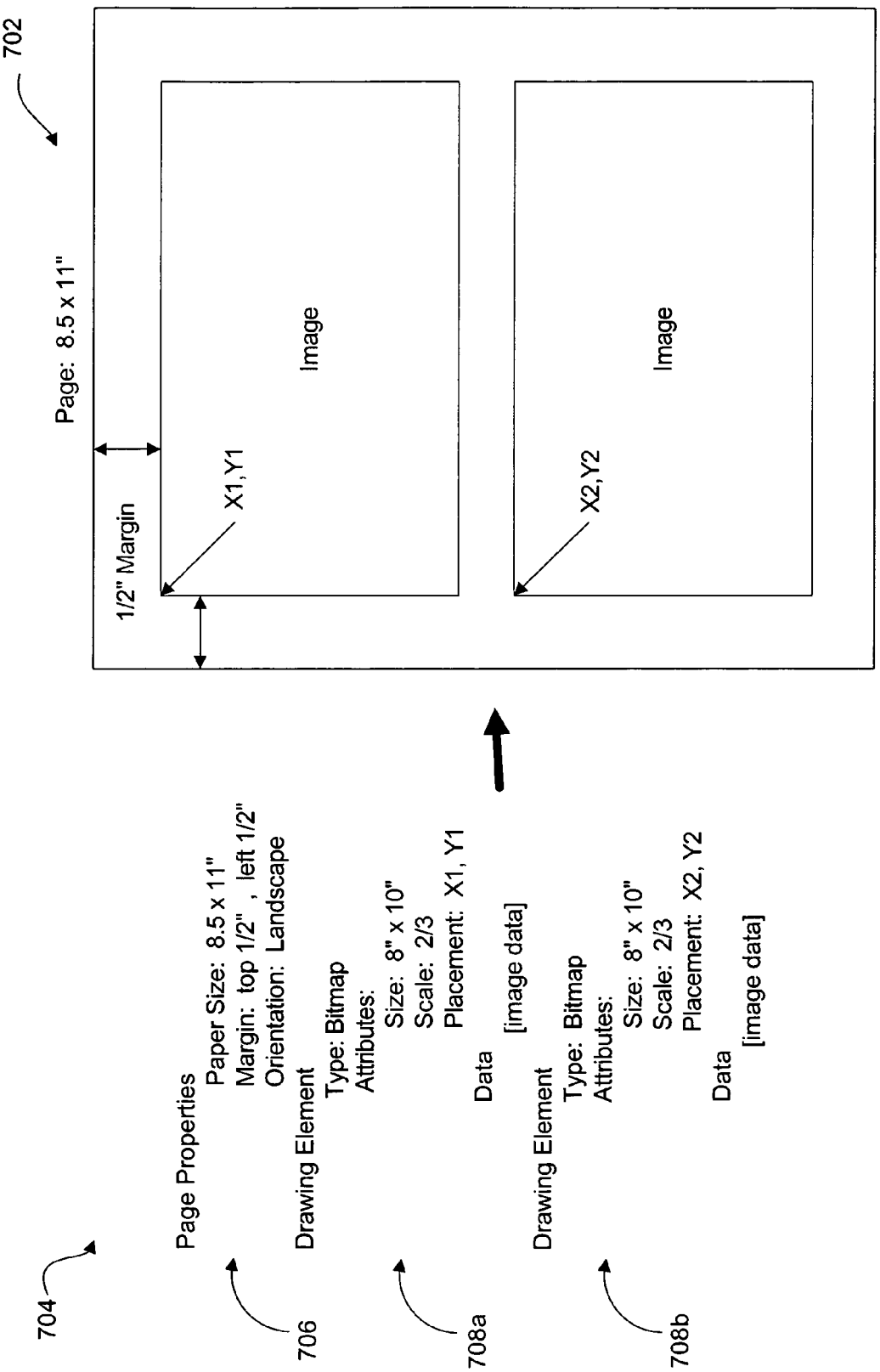
FIG. 7 is an example of a single document page in PDL encapsulated image data.

FIG. 7 is an example of a single document page 702 in PDL encapsulated image data 704. In this page, the page data 706 indicates the page size, margins and page orientation. The drawing elements 708 include two images scaled and placed for 2-up layout, as shown.

FIG. 8 is an illustration of a user specifying copy function options when generating PDL scanned image data. In this embodiment, the user operates a multi-functional peripheral 820 with a scanner function 822 to scan in a paper document and produce a scanned image(s) output, representative of the document. The multi-functional peripheral 820 also includes a printer function 826. In another embodiment the input may be from another non-paper source, such as a facsimile retrieval, or a memory stick containing digital images.

Initially, the image data (e.g., TIFF, JFIF) is encapsulated in a page description language format 824, as discussed above. The properties specified in the image attribute component of the image data reflect the properties prescribed and/or determined by the scanning operation, such as the image resolution, image size, and compression.

Next, and as shown in FIG. 9, the page properties of the pages containing the scanned image data reflect the document/page layout properties according to the default device settings 368 (e.g., page size, page orientation, n-up, duplex, etc.). Finally, the page properties may be further modified to reflect document/page layout options specified by the user at the front panel interface 828, or other input such as a web page.

In this example, the user operates the selections 828 on the device for a copy function, with the exception that the output is PDL encapsulated image data 824 instead of a paper output. The options specified in the copy function 828 are then stored as document/page properties of the PDL data 824. For example, a user may choose to scan in a 2 page document on 8.5"×11" paper with a ½" physical margin from the automatic document feeder (ADF). The scanner 822 produces image data with the approximate size of 8.5"×11", and a resolution either as the device's default or specified by the user as part of the scan function. In the course of this operation, the user also selected from the copy function operating panel 828 the 2-up page placement and letter paper size option. The image data is then encapsulated in a PDL format 824, where the PDL document (i.e., job)/page properties reflect either the options specified by the user at the front panel 828 or the device's 820 default settings (e.g., simplex document style). In this example, the user page size properties are set to the user specified setting of letter. Additionally, the 2-up option causes the page orientation to be rotated to landscape, the inclusion of both images (pages scanned in) on the same page (as two separate drawing elements), and the drawing elements attributes showing each image scaled to fit on ½ of the paper in landscape mode, with the first image placed on the left side and the second image placed on the right side. The user may further adjust the image data using other scan/edit features such as cropping and margin (white area border) removal.

Figure 10:
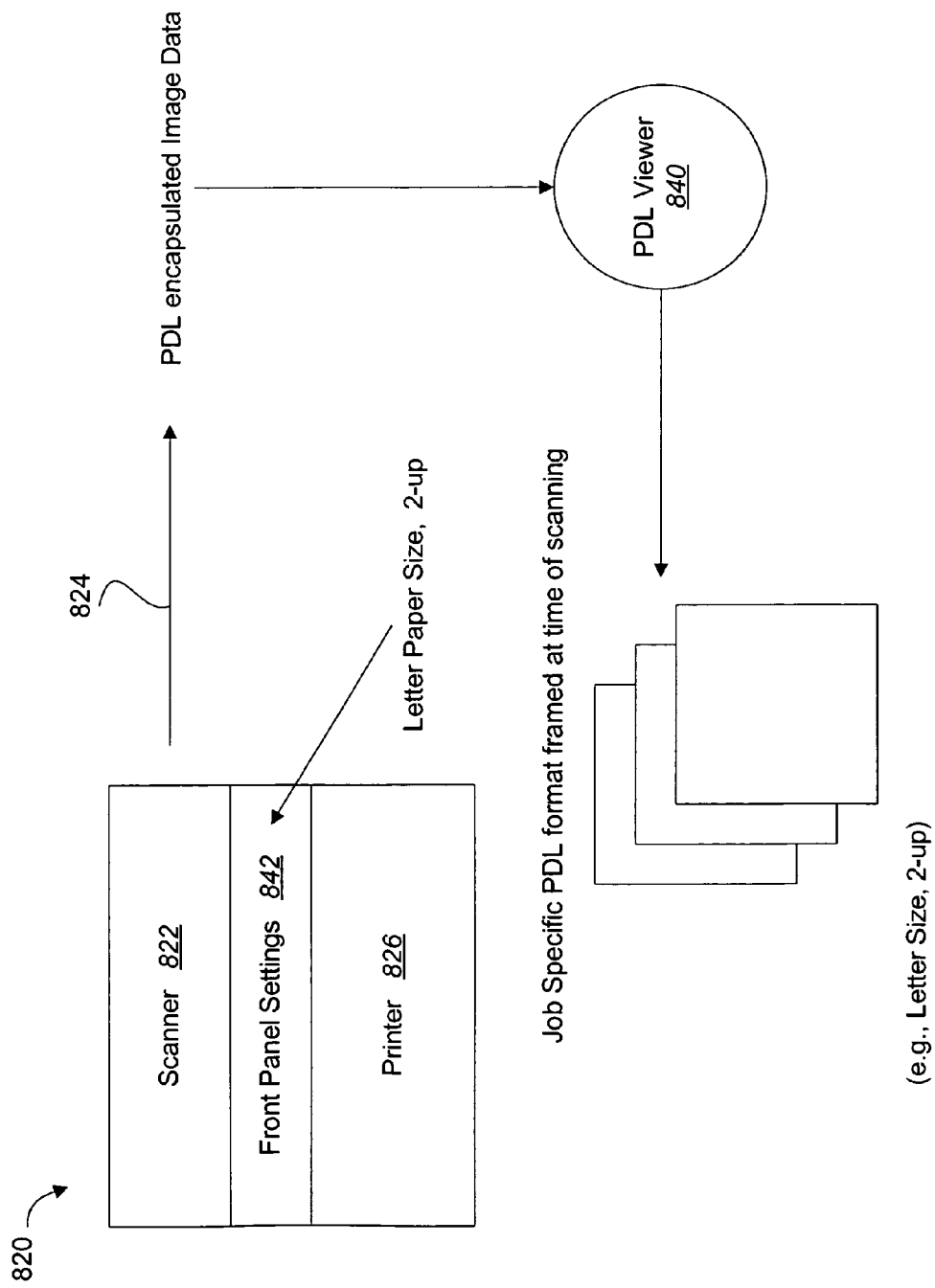
FIG. 10 is a logical block diagram illustrating a PDL viewer being used to view the PDL encapsulated image data.

FIG. 10 is a logical block diagram illustrating a PDL viewer 840 being used to view the PDL encapsulated image data 824. When the PDL encapsulated image data 824 produced by this method is viewed on a monitor by a PDL viewing application 840, the image data is document/page formatted according to the combined device default and user copy/scan function specified settings 842 at the time the image data was scanned. As in the above example, if the PDL was PDF and was viewed using Adobe Acrobat Reader, the image data would appear as a 8.5×11" page with 2 images side by side rotated in landscape mode. The PDL may also include non-view related document/page properties, such as duplex printing, number of copies, finishing. Those properties that have no effect on the view would be ignored by the viewer.

Figure 11:
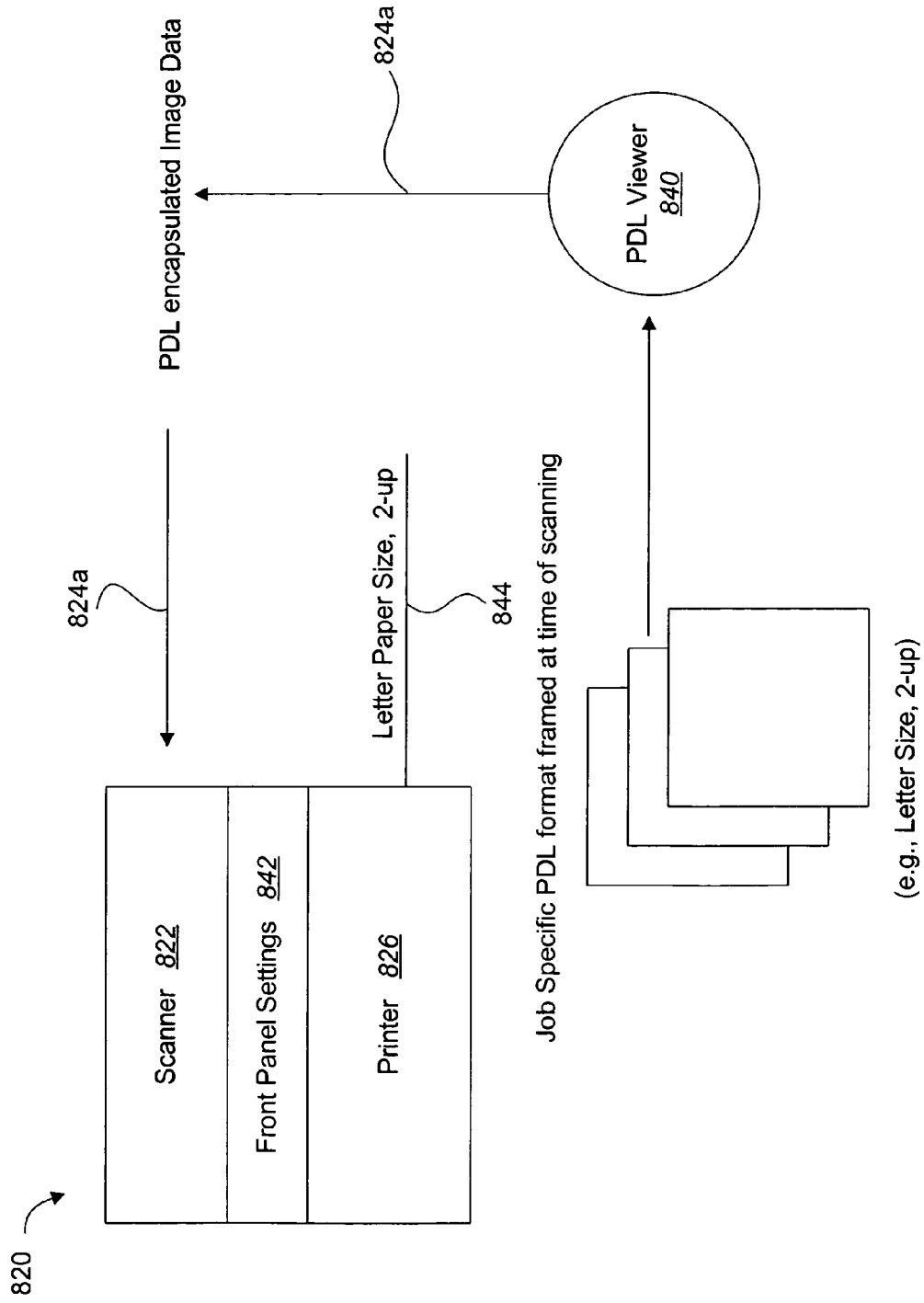
FIG. 11 is a logical block diagram illustrating a PDL viewer printing the PDL encapsulated image data.

FIG. 11 is a logical block diagram illustrating a PDL viewer 840 printing the PDL encapsulated image data 824*a*. If the PDL encapsulated image data 824*a* is resubmitted without further processing (i.e., AS-IS) to the MFP 820, which supports the PDL format for printing, as a print job, the output 844 from the MFP 820 would be identical as if the original operation was a copy function (i.e., paper output instead of scanned image data output). In the earlier example, the output would be a 2-up simplex print on letter size paper.

The present systems and methods may be implemented in many different embodiments. Other embodiments include, but are not limited to, the use of other page description languages and other imaging devices.

Although use with a scanner was illustrated, it will be appreciated that the present systems and methods may be applied to other embodiments. For example, the present systems and methods may be applied to fax retrieval, images retrieved from a storage device, memory stick, images retrieved from email attachment, images sent from cellular devices, images created by the imaging device, video and animation still images, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing page description language ("PDL") encapsulated image data from an imaging device that includes a scanner, the method comprising:
   scanning an image using the scanner to produce scanned image data as part of a scan job;
   obtaining document formatting inputs for the scan job from a user interface, the document formatting inputs being configurable at the user interface, and wherein the document formatting inputs comprise copy function options and scan function options usable with the scan job, the copy function options controlling the page orientation, page margins, and page size of the scan job;
   encapsulating the scanned image data in a page description language using the document formatting inputs for document formatting, wherein:
     the encapsulating occurs at the imaging device,
     the page description language comprises page properties and one or more drawing elements,
     the one or more drawing elements comprise drawing element attributes,
     the drawing element attributes are determined by the scan function options,
     the scanned image data is encapsulated initially according to page properties determined by the scanner,
     the page properties are modified in accordance with the copy function options, and
     the document formatting inputs control how the scanned image data is framed into a document defined by the page description language; and
   transmitting the page description language to a computing device from the imaging device, wherein the page description language that is transmitted indicates the page size, the page margins, and the page orientation of the scanned image data.

2. The method of claim 1, wherein the document formatting inputs are obtained from a control panel on the imaging device.

3. The method of claim 1, wherein the document formatting inputs are obtained from a local user interface.

4. The method of claim 1, wherein the document formatting inputs are obtained from a remote user interface.

5. The method of claim 1, wherein the imaging device is a multi-function peripheral.

6. The method of claim 1, wherein the document formatting inputs comprise a scale input, a placement input, a pagination input, a number of images per page input, a page order input, a document style input, a post collation operations input, and a page delimitation input.

7. The method of claim 6, wherein the imaging device comprises a multi-function peripheral, wherein the document formatting inputs are obtained from a control panel on the multi-function peripheral and wherein the control panel is also used for a user input for a copy function of the multi-function peripheral.

8. The method of claim 7, wherein the page description language is a language selected from the group consisting of a portable document format (PDF), postscript (PS), printer control language (PCL), HP GL/2, IBM IPDS, IBM SCS, Epson EscP and DDIF.

9. The method of claim 8, wherein the page description language further comprises document-wide properties and page-delimitation properties.

10. The method of claim 9, wherein page description language indicating the page size, the page margins, and the page orientation that is transmitted is identical to that which would have been obtained if the original operation was a copy job instead of a scan job.

11. The method of claim 10, wherein the scanned image data comprises a TIFF or JFIF file format.

12. The method of claim 11, wherein the page description language further comprises duplex printing properties, number of copies, and finishing properties that have no effect on the view of the document.

13. The method of claim 9, wherein the document-wide properties pertain to the rendering of the document as a whole, the page properties pertain to the rendering of a specific page, and the one or more drawing elements represent a visual representation of document data when the document is rendered.

14. The method of claim 13, wherein a drawing element further comprises a drawing element type and drawing element data, and wherein: the drawing element type is an identification of the type of the drawing element, the drawing element attributes include the data necessary for rendering the drawing element, and the drawing element data is data to render.

15. The method of claim 1, wherein the scan function options comprise image resolution, image size, and compression.

16. An imaging device that comprises a scanner, wherein the imaging device provides page description language ("PDL") encapsulated image data, the imaging device comprising:
   a processor for control of the imaging device;
   memory in electronic communication with the processor;
   a scanner in electronic communication with the processor;

a control panel for operation of the imaging device by a user, wherein the control panel is in electronic communication with the processor for receiving user inputs; and executable instructions executable by the processor, wherein the instructions are executable to:

scan an image using the scanner to produce scanned image data as part of a scan job;

obtain document formatting inputs for the scan job from the control panel, the document formatting inputs being configurable at the control panel, and wherein the document formatting inputs comprise copy function options and scan function options usable with the scan job, the copy function options controlling the page orientation, page margins, and page size of the scan job; and encapsulate the scanned image data in a page description language using the document formatting inputs for document formatting, wherein:

the encapsulating occurs at the imaging device, the page description language comprises page properties and one or more drawing elements, the one or more drawing elements comprise drawing element attributes, the drawing element attributes are determined by the scan function options, the document formatting inputs control how the scanned image data is framed into a document defined by the page description language, the scanned image data is encapsulated initially according to page properties determined by the scanner, the page properties are modified in accordance with the copy function options, and the page description language indicates the page size, the page margins, and the page orientation of the scanned image data.

17. The imaging device of claim 16, wherein the document formatting inputs comprise a scale input, a placement input, a pagination input, a number of images per page input, a page order input, a document style input, a post collation operations input, and a page delimitation input.

18. The imaging device of claim 16, wherein the imaging device is a multi-function peripheral imaging device that further comprises a printer in electronic communication with the processor, and wherein the control panel is also used for a user input for a copy function of the multi-function peripheral imaging device.

19. The imaging device of claim 16, wherein the page description language is a language selected from the group consisting of a portable document format (PDF), postscript (PS), printer control language (PCL), HP GL/2, IBM IPDS, IBM SCS, Epson EscP and DDIF.

20. The imaging device of claim 16, wherein the page description language comprises document-wide properties and page-delimitation properties.

21. A computer-readable medium for storing program data, wherein the program data comprises executable instructions in a computing device for providing page description language ("PDL") encapsulated image data from an imaging device that includes a scanner, the instructions being executable to:

obtain image data at an imaging device as part of a scan job;

obtain document formatting inputs for the scan job from a user interface, the document formatting inputs being configurable at the user interface, and wherein the document formatting inputs comprise copy function options and scan function options usable with the scan job, the copy function options controlling the page orientation, page margins, and page size of the scan job;

encapsulate the scanned image data in a page description language using the document formatting inputs for document formatting, wherein:

the encapsulating occurs at the imaging device, the page description language comprises page properties and one or more drawing elements, the one or more drawing elements comprise drawing element attributes, the drawing element attributes are determined by the scan function options, wherein the scanned image data is encapsulated initially according to page properties determined by the scanner, the page properties are modified in accordance with the copy function options, and the formatting inputs control how the scanned image data is framed into a document defined by the page description language; and transmit the page description language to a computing device from the imaging device, wherein the page description language that is transmitted indicates the page size, the page margins, and the page orientation of the scanned image data.

22. The computer-readable medium of claim 21, wherein the image data is obtained from a scanner of the imaging device.

23. The computer-readable medium of claim 22, wherein the document formatting inputs are obtained from a control panel on the imaging device.

24. The computer-readable medium of claim 23, wherein the imaging device is a multi-function peripheral.

25. The computer-readable medium of claim 23, wherein the document formatting inputs comprise a scale input, a placement input, a pagination input, a number of images per page input, a page order input, a document style input, a post collation operations input, and a page delimitation input.

26. The computer-readable medium of claim 22, wherein the document formatting inputs are obtained from a local user interface.

27. The computer-readable medium of claim 22, wherein the document formatting inputs are obtained from a remote user interface.

28. The computer-readable medium of claim 21, wherein the imaging device comprises a multi-function peripheral, wherein the document formatting inputs are obtained from a control panel on the multi-function peripheral and wherein the control panel is also used for a user input for a copy function of the multi-function peripheral.

29. The computer-readable medium of claim 21, wherein the page description language is a language selected from the group consisting of a portable document format (PDF), postscript (PS), printer control language (PCL), HP GL/2, IBM IPDS, IBM SCS, Epson EscP and DDIF.

30. The computer-readable medium of claim 21, wherein the page description language comprises document-wide properties and page-delimitation properties.

* * * * *

UNITED STATES PATENT AND TRADEMARK OFFICE
CERTIFICATE OF CORRECTION

| | |
|---|---|
| PATENT NO. | : 8,023,161 B2 |
| APPLICATION NO. | : 10/787365 |
| DATED | : September 20, 2011 |
| INVENTOR(S) | : Andrew R. Ferlitsch |

Page 1 of 1

It is certified that error appears in the above-identified patent and that said Letters Patent is hereby corrected as shown below:

In column 14, line 17, please delete "wherein".

Signed and Sealed this
Twenty-first Day of February, 2012

David J. Kappos
*Director of the United States Patent and Trademark Office*